Patented Mar. 12, 1940

2,192,956

UNITED STATES PATENT OFFICE 2,192,956

PIGMENT MANUFACTURE

Clifford K. Sloan and Gordon D. Patterson, Wilmington, Del., assignors to E. I. du Pont de Nemours & Company, Wilmington, Del., a corporation of Delaware No Drawing. Application July 22, 1936,
Serial No. 91,969

10 Claims. (Cl. 134—58)

This invention relates to pigments, and more particularly to processes for improving the texture and other properties of pigments, and to improved pigment compositions.

Most pigment manufacturing processes involve the formation of the same at some stage as a precipitate in an aqueous system. In ordinary practice it is often desirable that such precipitate be washed to lower the concentration of water soluble salts prior to subsequent processing including further chemical treatment, filtration and drying, etc. As ordinarily practiced, this washing operation is often very troublesome whether it be accomplished by vat decantation or by filtration. Especial difficulty is encountered with aqueous pigment slurries that contain small well dispersed individual pigment particles, inasmuch as these fine particles settle very slowly in the vat decantation process and likewise filter very slowly. In addition to the time-consuming element, such processes often are inefficient due to loss of material by incomplete settling in the vat decantation process and likewise by incomplete retention of pigment by the filter material.

Ordinary pigment practice involves the drying of a water wet pigment system. This drying is accomplished by evaporation of water ordinarily at an elevated temperature although some processes are carried on at atmospheric temperatures. Unfortunately, aggregation or cementation of the originally precipitated small particles often occurs during this drying operation in the case of many pigments, especially those that tend to give difficulty in the filtration operation. As the result of this aggregation, the finally dried pigment is much more difficult to grind to a suitable particle size during incorporation in organic vehicles such as are used in the manufacture of coating compositions.

This invention has as an object improvement in the process of preparation of pigments. A further object is that of improving the ease and efficiency with which pigments can be processed during filtration and washing of an aqueous mixture of the same. A still further object is the production of pigments of improved texture to facilitate grinding of the same in organic vehicles. Another object is to prevent the formation of hard tenacious aggregates of pigment particles in dried pigments which are difficult to grind. Still further objects will appear in connection with the following description.

These objects are accomplished in accordance with the following invention by applying surface-active compounds that are water-soluble or attain water-solubility, the nuclei of which compounds are characterized by having a long-chain aliphatic group in the positive radical of the compound rather than in the negative radical such as is the case with ordinary soaps. Such surface-active materials having the long-chain aliphatic group in the positive radical can be classed and are referred to in the specification and claims as cation-active materials in contrast to the ordinary surface-active materials which are anion-active. This differentiation between cation-active and anion-active materials is discussed by H. Bertsch (Zeit. f. angew Chemie 48, 52 (1935)).

Among the cation-active materials used in the following invention are included all materials that are capable of furnishing in water systems positive radicals having an aliphatic chain of eight or more carbons. Included in this category are the aliphatic long-chain quaternary ammonium, long-chain sulfonium, and long-chain phosphonium compounds. These materials are used in the practice of this invention either as water-soluble salts, such as the sulfates, chlorides, bromides, etc., or in certain cases as free bases as when using the ammonium or phosphonium types of materials. Included in the types of cation-active materials operative are long-chain amines which may be of a primary, secondary, or tertiary character. Inasmuch as many of these long-chain amines are relatively insoluble in water, they may desirably be solubilized either by reaction with water-soluble acids or by introduction of hydrophilic groups such as hydroxy and carboxylic groups within the molecule. Solubilization may be accomplished either prior to use or during actual processing as hereinafter described.

Our invention consists in the coating of the pigment by the addition of relatively small amounts of the above type of compounds to the water-phase of the pigment at some time prior to the stage of manufacture at which the same is otherwise ordinarily dried. The agent may conveniently be added either (1) after completion of the pigment strike but prior to washing, (2) after completion of vat washing but prior to filtration, or (3) after completion of filter press washing but prior to drying. The treated pigment is then processed in the ordinary manner giving a final dry pigment of improved texture.

The following examples are intended to illustrate the invention but the invention is not limited to the examples.

*Example I*

An iron blue pigment composed largely of ferric ferrocyanide and known commercially as Chinese blue is precipitated by methods well known in the art of manufacture of ferrocyanide pigments. The pigment is filter pressed and washed to remove most of the soluble material of the pigment slurry consisting largely of sulfates and sulfuric acid.

Four hundred parts of the resultant press cake containing 100 parts of iron blue pigment are treated with 12 parts of octadecyl dimethylamine hydrochloride in 24 parts of aqueous solution, the amine solution being added slowly with agitation in a mixer capable of handling the originally thick press cake material. The resultant mixture is dried and pulverized by methods ordinarily used in iron blue manufacture. The final product is characterized by the ease with which it can be ground in a coating composition vehicle.

Example II

A slurry of Chinese blue prepared as indicated in Example I is treated with a cation-active material, prior to washing out of water-soluble electrolytes, as follows:

A 10 per cent solution containing 2.62 pounds of hexadecyl pyridinium bromide is added to 440 pounds of the unwashed slurry containing 17.5 pounds of iron blue pigment. This amount thus corresponds to about 15% of the pigment treated. The treated pigment slurry is highly flocculated and can be filtered pressed and washed in one half of the time ordinarily required with simultaneous improvement in yield. The finally dried pigment also grinds out more rapidly and completely in coating compositions.

Example III

An unwashed Chinese blue slurry is treated as in Example II except that the 2.62 pounds hexadecyl pyridinium bromide solution is replaced by 0.88 pound of methyl benzyl octadecyl sulfonium methyl sulfate, the amount of agent corresponding to about 5 per cent of the pigment treated. The resultant treated slurry is flooded with water and washed by the commonly called vat washing process involving decantation. Use of the cation-active agent causes increased flocculation with more rapid settling of pigment in the vat and less tendency to go colloidal. Final filtration to remove further water is also facilitated. After drying by ordinary methods an iron blue pigment of superior texture is obtained.

Whereas the above examples illustrate the use of relatively few cation-active materials, our invention includes the use of all such materials in the treatment of an aqueous system containing a pigment. By the term cation-active we means aliphatic compounds which in aqueous systems yield positive radicals having an alkyl or substituted alkyl chain containing at least 8 carbons.

The first species of this general class of agent consists of water-soluble salts of organic bases which bases are characterized by having at least one basic nitrogen containing residue and at least one long-chain aliphatic residue.

The first species can be divided into two groups. As an example of the first of these groups, we may use water-solubilized long-chain amine compounds of either primary, secondary, or tertiary character which may be solubilized by methods including salt formation with water-soluble inorganic acids or by formation of hydroxy or carboxy derivatives of these long-chain amines. As specific representatives of long-chain amines that can be readily solubilized by addition of acids like sulfuric, hydrochloric, etc., we may utilize dodecyl amine, hexadecyl amine, octadecyl amine, and the corresponding secondary or tertiary alkyl derivatives of the same, i. e., dodecyl dimethyl amine, didodecyl amine, octadecyl diethyl amine, etc. As representatives of long-chain amines partially or completely solubilized by relatively water polar groups, such as hydroxy or carboxy derivatives, we may utilize such materials as didodecyl amine ethanol, dodecyl diglycerol amine, dodecyl methylglucamine, esters formed from long-chain alcohols and amino acids, esters formed from fatty acids and hydroxy amines, and by ester interchange with fatty oils and hydroxy amines, etc. In certain cases it is not necessary to solubilize the agent prior to addition of the same to the water-pigment slurry. This is the case, for example, with long-chain amines, when there is sufficient free acid in the pigment slurry to react with the amine, solubilizing the same due to salt formation in process. In the use of long-chain amines, some caution must be exercised as to sensitivity of the same to electrolytes present in the pigment slurry. As an example, we find that certain long-chain amines can not be as readily used in our process if there is considerable sulfate ion present in the pigment slurry due to formation of a relatively insoluble sulfate compound before the long-chain compound can orient itself at the pigment surface. In such an event, it is necessary either to wash out the interfering electrolyte before treatment or to make use of some other cation-active material less sensitive to this electrolyte.

A second group of the first species of the above nitrogen-containing species consists of quaternary ammonium compounds containing at least one long alkyl chain containing 8 or more carbons. Representative compounds of this class include octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, etc. Long-chain betaines such as octadecyl betaine are useful for our purpose, being related to this type of species. Even other examples of compounds of this type are given in U. S. Patent 2,004,476 disclosing the use of this species in textile treatment.

A second species of the class operative in the present invention consists of water soluble salts of organic compounds which are characterized by having at least one ternary sulfonium residue to which is attached at least one alkyl chain containing 8 or more carbons. As specific representatives of this species including compounds in which the sulfur atom has a positive valence of four are to be included: methyl benzyl stearyl sulfonium methyl sulfate, lauryl dimethyl sulfonium methyl sulfate, etc.

A third species of the class operative in the present invention includes phosphorous compounds similar in structure to the nitrogen-containing compounds described under the first species. They include water-soluble salts of organic compounds which are characterized by having at least one phosphonium residue to which is attached at least one aliphatic group containing an aliphatic residue of at least 8 carbon atoms.

Whereas we may use the cation-active agents as defined above, we prefer to use the cationagents in which the alkyl or alkoxyalkyl group is attached directly to the nitrogen, phosphorous or sulphur residue and the esters formed from long-chain alcohols and amino acids, esters formed from fatty acids and hydroxy amines, and by ester interchange with fatty oils and hydroxy amines as defined in application Serial No. 91,970, filed July 22, 1936, by Clifford K. Sloan, Gordon D. Patterson, Winfield W. Heckert and Paul L. Salzberg.

It is to be understood that our invention is not limited to iron blue pigments as listed in the above examples. The examples are to be taken as illustrative of the applicability of our invention to all pigments, and especially to those which give difficulty in washing, filtration, and texture. The invention includes the use of cation-active agents for treatment of aqueous systems containing all pigments including such materials well known commercially as iron blue, chrome yellow, chrome orange, chrome green, zinc chromate, red lead, lithol red, phosphotungstic acid toners, phthalocyanines, azo type toners, aluminum hydrate, lakes, carbon black, iron oxide, zinc oxide, titanium-containing pigments, zinc sulfide-containing pigments, zinc oxide, white lead, extenders, etc. Although it is realized that certain of these pigments such as carbon black are not in aqueous mixture ordinarily, it is to be understood that our invention is applicable to such dry pigments when they are brought into an aqueous system.

By the term pigment we mean substances which are generally considered insoluble in the vehicle as distinguished from dyestuffs which are generally considered soluble. For example, pigments generally have the property of light refractivity, tending to give opacity to the system, whereas dyes generally have only the property of light absorption, tending to retain the transparency of the system.

The amount of cation-active agent to be used in accordance with our invention varies considerably with the particular pigment system and in the magnitude of the effect desired. The specific surface and density of the pigment to be treated are important factors. Thus, with a relatively large particle size and dense chrome orange one half per cent by weight of agent on a pigment has been used with good results in treatment whereas with iron blue which is precipitated as a very small particle sized and less dense material, 15 per cent was found to effect a marked texture improvement. These figures are not to be taken as a limiting range but are given to indicate the factors to be considered in operating the invention. For example, certain relatively coarse pigments such as extenders, can be successfully treated using definitely less than the one half per cent indicated, say 0.1%. On the other hand, certain of the very finely divided pigments may require as much as 20 per cent agent. Those operating this invention on a given pigment will observe an optimum range below which texture improvement is incomplete and above which additional agent re-disperses pigment in the aqueous system giving rise to decreased filtration efficiency. It is thus to be understood that the preferred range as to amount of agent to be used for texture improvement is largely dependent on the pigment being used and may be at least as low as about 0.1% and at least as high as about 20% but more or less can be used. The preferred range for iron blue pigments is about 3% to about 20%. Approximately the following amounts of agent have given excellent results, 0.5% with chrome orange, about 0.2% to about 5.0% with chrome yellow, 8.0% with Lake Bordeaux B, and about 4.0% with copper phthalocyanine. With these pigments more or less of the agent can be used with effect, for example from about 0.1% to about 20% to improve the texture. With other pigments the improvement in texture is commensurate with those which have been mentioned.

The above statements are illustrative of the amounts of agents desirable for use in obtaining texture improvement. It is to be understood that significant improvement in washing and filtration can often be obtained by using considerably less agent. Thus, for a given pigment, the amount of agent that beneficially effects the efficiency of vat and filter press washing may be in the range as low as one tenth of that amount desirable for optimum texture improvement. Thus we prefer to use from about 0.01% to about 20.0% of the agent for this purpose.

It will be readily appreciated by those using this invention that the choice of agent and the amount of the same to be used will be dependent on other factors including cost, probability of reaction with water-soluble constituents of the mother liquor with resultant decreased effectiveness, etc.

As indicated in co-pending application Serial No. 91,967 filed July 22, 1936, it is believed that the cation-active agents are highly adsorbed by pigment surfaces, such adsorption supposedly coating the surface of the pigment with a relatively hydrophobic layer. Whereas in said co-pending case, this hydrophobic layer is made use of in transferring the pigment directly to an organic phase, the present invention makes use of the flocculation effect of the coating imparted by cation-active agents in securing greater washing and filtration efficiency and in obtaining a finally dried pigment that can be ground out by ordinary methods in organic vehicles, especially those used in coating compositions.

Furthermore this type of agent is usually applicable under conditions of acidity and in presence of heavy metal ions that are so often present in pigment slurries after precipitation of the pigment. Under these conditions, it is well established that ordinary anion-active agents tend to be precipitated before adsorption can occur at the pigment surface itself.

Thus the invention is particularly advantageous with such pigments as iron blues that have given considerable difficulty in filtration because of fineness of particle size and because of the lack of a strong hydrophobic polarity. As a representative of this general class, iron blue is prepared under conditions of acidity and heavy metal ions that have prevented successful application of ordinary agents for the purposes of the present invention. Furthermore this type of pigment is ordinarily particularly prone to aggregation during drying and has given rise to difficulties in grinding in coating composition vehicle constituents.

Even though it usually is most advantageous under our invention to add the cation-active agent to unwashed slurry of the pigment, it is to be understood that the invention is also operative by application of agent at any stage prior to final drying of the pigment from water. Thus addition of cation-active agent can be made by mixing the same with a water press cake or paste of pigment prior to drying. The latter process is effective in promoting texture improvement even though the aqueous pigment mixture is not filtered in the presence of the agent.

As other embodiments of the invention will be suggested to those skilled in the art without departing from the spirit and scope of the invention, no limitations are intended in the annexed claims, except such as are specifically expressed or are imposed by the prior art.

We claim:

1. A process which comprises adding to a water wet pigment from about 0.01% to about 20%, based on the weight of the pigment, of a water-soluble cation-active salt of an organic compound having at least one ternary sulphonium radical and at least one long chain aliphatic radical containing at least 8 carbon atoms in chain length attached directly to the sulfur atom, separating the excess water, and drying and recovering said pigment as a dry bulk powder.

2. A process which comprises flocculating a water-wet pigment by adding thereto a water-soluble cation-active agent selected from the class consisting of amines containing only one nitrogen atom, salts of amines containing only one nitrogen atom, quaternary ammonium compounds containing only one nitrogen atom, sulfonium compounds, and phosphonium compounds, said compounds containing an open chain aliphatic radical of at least eight carbon atoms in chain length directly attached respectively to the nitrogen, sulfur, and phosphorus atoms, separating the excess water, drying the pigment, and recovering said pigment as a dry bulk powder.

3. A process which comprises flocculating a water-wet pigment by adding thereto from about 0.01% to about 20%, based on the weight of the pigment, of a water-soluble cation-active amine containing only one nitrogen atom, said compound containing an open chain aliphatic radical of at least 8 carbon atoms in chain length directly linked to the nitrogen atom, separating excess water, drying the pigment, and recovering said pigment as a dry bulk powder.

4. A process which comprises flocculating a water-wet pigment by adding thereto from about 0.01% to about 20%, based on the weight of the pigment, of a water-soluble cation-active salt of an amine containing only one nitrogen atom, said compound containing an open chain aliphatic radical of at least 8 carbon atoms in chain length directly linked to the nitrogen atom, separating excess water, drying the pigment, and recovering said pigment as a dry bulk powder.

5. A process which comprises flocculating a water-wet pigment by adding thereto from about 0.01% to about 20%, based on the weight of the pigment, of a water-soluble cation-active quaternary ammonium compound containing only one nitrogen atom, said compound containing an open chain aliphatic radical of at least 8 carbon atoms in chain length directly linked to the nitrogen atom, separating excess water, drying the pigment, and recovering said pigment as a dry bulk powder.

6. A process for producing a pigment in dry bulk form which comprises flocculating a water-wet pigment by adding thereto from about 0.01% to about 20%, based on the weight of the pigment, of a water-soluble cation-active agent selected from the class consisting of amines having only one nitrogen atom, salts of amines containing only one nitrogen atom, quaternary ammonium compounds containing only one nitrogen atom, sulfonium compounds, and phosphonium compounds, said compounds containing an open chain aliphatic radical of at least eight carbon atoms in chain length directly linked respectively to the nitrogen, sulfur, and phosphorus atoms, drying the pigment, and recovering said pigment as a dry bulk powder.

7. A process for producing a pigment in dry bulk form which comprises flocculating a precipitated water-wet pigment by adding thereto from about 0.01% to about 20%, based on the weight of the pigment, of a water-soluble cation-active agent selected from the class consisting of amines containing only one nitrogen atom, salts of amines containing only one nitrogen atom, quaternary ammonium compounds containing only one nitrogen atom, sulfonium compounds, and phosphonium compounds, said compounds containing an open chain aliphatic radical of at least eight carbon atoms in chain length directly attached respectively to the nitrogen, sulfur, and phosphorus atoms, separating excess water, drying the pigment, and recovering said pigment as a dry bulk powder.

8. A process for producing a pigment in dry bulk form which comprises flocculating a water-wet pigment by adding thereto from about 0.01% to about 20%, based on the weight of the pigment, of an alkyl pyridinium halide the alkyl radical of which contains at least 8 carbon atoms in chain length directly attached to the nitrogen atom, drying the pigment, and recovering said pigment as a dry bulk powder.

9. A process for producing a pigment in dry bulk form which comprises flocculating a water-wet pigment by adding thereto from about 0.01% to about 20%, based on the weight of the pigment, of a water-soluble cation-active salt of a long chain alkyl amine the alkyl radical of which contains at least 8 carbon atoms in chain length directly attached to the nitrogen atom, drying the pigment, and recovering said pigment as a dry bulk powder.

10. A process which comprises flocculating a water-wet titanium containing pigment by adding thereto a water-soluble cation-active agent selected from the class consisting of amines containing only one nitrogen atom, salts of amines containing only one nitrogen atom, quaternary ammonium compounds containing only one nitrogen atom, sulfonium compounds, and phosphonium compounds, said compounds containing an open chain aliphatic radical of at least eight carbon atoms in chain length directly attached respectively to the nitrogen, sulfur, and phosphorus atoms, separating the excess water, drying the pigment, and recovering said pigment as a dry bulk powder.

CLIFFORD K. SLOAN.
GORDON D. PATTERSON.